Jan. 23, 1968

D. GREEN 3,364,718

EXTRUSION APPARATUS

Filed July 27, 1965

United States Patent Office 3,364,718
Patented Jan. 23, 1968

3,364,718
EXTRUSION APPARATUS
Derek Green, Lytham Saint Anne's, England, assignor to United Kingdom Atomic Energy Authority, London, England
Filed July 27, 1965, Ser. No. 475,092
Claims priority, application Great Britain, Aug. 10, 1964, 32,544/64
4 Claims. (Cl. 72—253)

ABSTRACT OF THE DISCLOSURE

An extrusion die in the form of a ring of part annular segments having abutting radial faces, the segments defining a die aperture of required cross sectional shape and being contained within a thin tubular sheath. In use of the die hydraulic liquid under pressure is applied on the outer circumferential surface of the tubular sheath to hold the segments together against the internal pressure of material extruded through the die.

This invention relates to extrusion dies and in particular relates to extrusion dies for the production of articles of complex cross sectional shape. Such extrusion dies are difficult and expensive to make by conventional machining operations because of the complications involved in forming a die orifice of complex cross sectional shape in a blank of hard wear resistant material. This is particularly the case when a very hard high strength material must be used in the manufacture of a die for extrusion of materials under high pressure.

According to the present invention an extrusion die comprises a ring of part annular die aperture segments having abutting radial faces, the segments being bound externally by a thin tubular sheath, the individual segments of the ring being shaped so that, in combination the segments define a die orifice of required cross sectional shape, the segments forming the ring being held together in use of the die by pressurised hydraulic liquid applied on the outer circumferential surface of the tubular sheath, sealing means being provided for preventing access of pressurised hydraulic liquid to the end faces of the ring of segments.

In dies in accordance with the invention no tensile stresses can exist in the individual segments which enables the segments to be made of materials which have a very high strength in compression but whose brittleness or weakness in tension obviates their use in extrusion dies of conventional solid ring construction. Examples of such materials are ceramics such as aluimna or tungsten carbide.

Compound extrusion dies in accordance with the invention are particularly applicable for use in a hydrostatic extrusion process in which a workpiece is extruded through a die by pressurisation of a hydraulic liquid in which the workpiece is immersed. In use of compound dies in accordance with the invention for operation of a hydrostatic extrusion process the pressurised hydraulic liquid applied to the workpiece is also applied simultaneously on the outer circumferential surface of the tubular sheath which embraces the ring of segments forming the die. The application of the pressurised liquid on the outer surface of the tubular sheath of the die pressurises the tubular sheath radially inwards and holds the segments of the die together against the outwards pressure of material being extruded through the die.

Embodiments of the invention will now be described by way of example with reference to the accompanying drawings in which.

Figure 1:
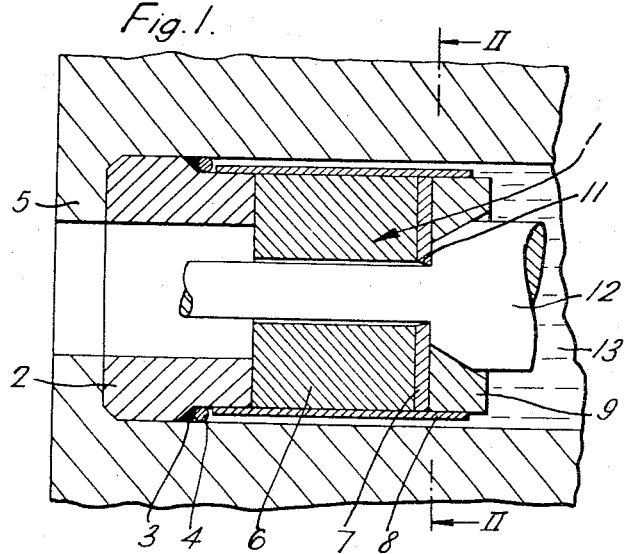
FIGURE 1 is a longitudinal cross sectional elevation of a compound extrusion die in accordance with the invention.
Figure 2:
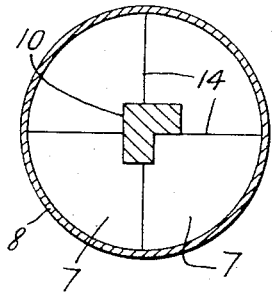
FIGURE 2 is a cross section along the line II—II in FIGURE 1.

FIGURES 1 and 2 show extrusion apparatus including a compound extrusion die 1 constructed in accordance with the invention. The die 1 is assembled on a standard die base ring 2, fitted with a copper sealing ring 3 and an O ring seal 4 which seal the die 1 in the mouth of an extrusion container 5. The die 1 comprises four thrust bearing segments 6 and four die aperture segments 7 assembled within a tubular sheath 8 of hard drawn tubular copper. Alternatively a sheath 8 of plastic material such as nylon may be employed. The base ring 2 fits in one end of the sheath 8 and a conical bore entry ring 9 is fitted in the sheath 8 at the die entry to seal the die aperture segments 7. As shown in FIGURE 2 the die aperture segments 7 and the thrust bearing segments 6 have abutting radial faces 14 and are shaped to define a die aperture 10 of L shaped cross section. The die aperture segments 7 are, for example, made from the tool steel referenced under British Standards as S.C.13. This material is readily machined to form the segments 7 in the required shape and the segments 7 are then hardened by heating to 930/950° C. for 30–45 minutes and quenching in oil followed by tempering by heating to 400° C. and cooling in still air. The thrust bearing segments 6, the die base ring 2 and the die entry ring 9 are, for example, made from the steel referenced under British Standards as EN25. This material is hardened by heating to 850° C. and quenching in oil followed by tempering by heating to 200° C. and cooling in still air. The edges of the die aperture segments 7 defining the die aperture 10 are bevelled as at 11 to provide a small amount of relief in the die aperture 10.

In use of the apparatus a billet 12 is extruded through the die 1 under the action of hydraulic fluid 13 pressurised in the extrusion container 5 about the billet 12. The pressurised hydraulic fluid 13 also acts on the tubular sheath 8 of the die so that the sheath 8 is pressurised radially inwards to hold the segments 6 and 7 of the die together during the extrusion of the billet 12.

Figure 3:
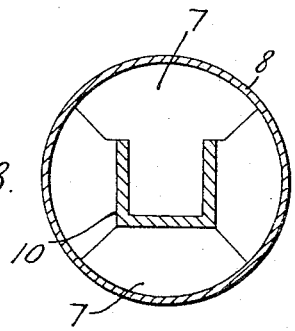
FIGURES 3 and 4 are cross sections showing modifications of the form of die shown in FIGURES 1 and 2.
Figure 4:
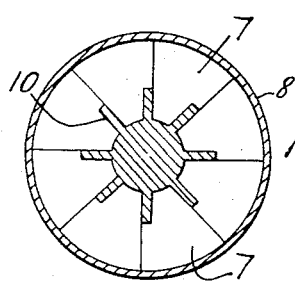

FIGURES 3 and 4 show alternative forms of die aperture 10 produced by appropriate shaping of the die segments 6 and 7. In FIGURE 3 the die segments 6 and 7 are shaped to provide a die aperture 10 for the extrusion of a rod having radially projecting longitudinal fins. In FIGURE 4 the die segments 6 and 7 are shaped to provide a die aperture 10 of U shape. Die apertures 10 of a wide variety of shapes can be formed by appropriate shaping of the die segments 6 and 7. In the die 1 no tensile hoop stresses can exist in the segments 6 and 7 and hence the segments 6 and 7 may alternatively be made from hard wearing materials which have a very high strength in compression but whose brittleness or weakness in tension obviates their use in extrusion dies of orthodox integral construction. Examples of such materials are ceramics such as alumina or tungsten carbide.

I claim:

1. An extrusion die comprising a ring of part annular die aperture segments having abutting radial faces, the segments being bound externally by a thin tubular sheath, the individual segments of the ring being shaped so that, in combination, the segments define a die orifice of required cross sectional shape, the segments forming the ring being held together in use of the die by pressurised hydraulic liquid applied on the outer circumferential surface of the tubular sheath, sealing means being provided for preventing access of pressurised hydraulic liquid to the end faces of the ring of segments.

2. An extrusion die as claimed in claim 1 wherein the die aperture segments are of thin plate-like form sealed on their front face by an annular sealing ring fitting in one end of the tubular sheath and backed by a ring of part annular thrust bearing segments and an annular base ring fitting in the other end of the tubular sheath, means being provided on the base ring for sealing the die peripherally in the mouth of an extrusion container.

3. An extrusion die as claimed in claim 1 wherein the die aperture segments are made of a ceramic material of high compressive strength such as alumina or tungsten carbide.

4. An extrusion die as claimed in claim 2 wherein the die aperture segments are made of a ceramic material of high compressive strength such as alumina or tungsten carbide.

References Cited
UNITED STATES PATENTS

| | | | |
|---|---|---|---|
| 1,836,821 | 12/1931 | Singer | 72—271 |
| 2,882,759 | 4/1959 | Altwicker | 72—467 X |

FOREIGN PATENTS 476,793  9/1951  Canada.

CHARLES W. LANHAM, *Primary Examiner.*